United States Patent [19]
Knorr

[11] Patent Number: 4,650,631
[45] Date of Patent: Mar. 17, 1987

[54] INJECTION, CONTAINMENT AND HEATING DEVICE FOR FUSION PLASMAS

[75] Inventor: George E. Knorr, Iowa City, Iowa

[73] Assignee: The University of Iowa Research Foundation, Iowa City, Iowa

[21] Appl. No.: 609,990

[22] Filed: May 14, 1984

[51] Int. Cl.$^4$ ................................................ G21B 1/00
[52] U.S. Cl. .................................... 376/127; 376/107; 376/128
[58] Field of Search ............... 376/107, 128, 127, 129, 376/130

[56] References Cited

U.S. PATENT DOCUMENTS

| | | | |
|---|---|---|---|
| 3,085,173 | 4/1963 | Gibson et al. | 376/107 |
| 3,274,435 | 9/1966 | Kerst | 376/128 |
| 3,571,642 | 3/1971 | Westott | 376/127 |
| 3,831,101 | 8/1974 | Benford et al. | 376/130 |
| 4,115,191 | 9/1978 | Ott et al. | 376/128 |
| 4,240,873 | 12/1980 | Linlor | 376/107 |
| 4,421,713 | 12/1983 | Manheimer et al. | 376/128 |

FOREIGN PATENT DOCUMENTS 656398  8/1951  United Kingdom ................ 376/107

OTHER PUBLICATIONS

Nuclear Fusion, vol. 21, No. 12, 1981, Manheimer et al. (II), pp. 1559–1571.

Primary Examiner—Harvey E. Behrend
Attorney, Agent, or Firm—Oblon, Fisher, Spivak, McClelland & Maier

[57] ABSTRACT

A container device for a fusion plasma which has a beam of charged particles accelerating system feeding an ion or plasma beam into a polytron magnetic device. The polytron is formed from a succession of magnetic cusps joined point to point around a torus. The accelerating system introduces an ion or plasma beam into the polytron through a magnetic junction. A second accelerating system may introduce a second beam of different velocity creating an instability and turbulent mixing of the two beams, which are favorable for a fusion reaction.

7 Claims, 12 Drawing Figures

INJECTION, CONTAINMENT AND HEATING DEVICE FOR FUSION PLASMAS

BACKGROUND OF THE INVENTION

1. Field of the Invention:

This invention relates generally to a confinement device for a nuclear fusion plasma and more particularly to a polytron confinement device for a nuclear fusion plasma having an ion or plasma injection system.

2. Description of the Prior Art

It has been generally accepted that nuclear fusion as a power source holds great promise and may eventually even solve the energy problems of the world. A workable power system using this energy source has thus far eluded scientists and engineers, largely due to the problems of containment of the fusion material. In order to obtain a self-sustaining reaction, it is necessary to heat the fusion material to a very high temperature. At this temperature all material becomes a plasma of charged ions and electrons which is difficult to contain. Traditional solid walls are unable to hold such a plasma since any wall material would be vaporized instantly by the high temperatures and become part of the plasma.

A viable solution to this problem is a magnetic confinement. One particular type is the Tokamak. It consists of a torus in which a strong circular vacuum magnetic field along the torus is created by current carrying coils, encircling the torus. This magnetic field alone cannot confine the plasma, but a current, which flows along the magnetic field lines has to be induced in the plasma, which produces helically twisted magnetic field lines, which keep the plasma away from solid walls. A description of this may be found in an article by H. P. Furth entitled "The Tokamak" in *Fusions*, Academic Press volume 1 part A at page 103. While many devices have been built using this principle, none have yet progressed to the point of a usable self sustaining reaction.

Another device that has been suggested is the Polytron apparatus, described by M. G. Haines in *Nuclear Fusion*, 17, page 811, (1977) and M. Rhodes et al in *Physical Review Letters*, 48, page 1821, (1982), and shown generally as 10 in FIG. 1. Externally, this device resembles the Tokamak in that a toroidal vacuum centered track 12 has circular coils 14 surrounding cross sections of the torus. In this device, however, as seen in FIG. 2 adjacent coils 14 carry currents in opposite directions so that the magnetic field lines 18 form a circular line cusp parallel to the circular coils and halfway between adjacent coils. When a charged particle beam travels through the device, it tends to follow the axis of the torus since any divergence of the beam moves the particles into a strong magnetic field near the coils. This creates a focusing effect similar to that known in electron microscopy. (See W. Glaser "Elctronen-und Ionenoptik, Vol. XXXIII Korpuskularoptic", *Handbuch der Physik*). The configuration has the advantage that all the magnetic field lines are curved away from the plasma. This provides magnetohydrodynamic stability for the configuration, as described by N. A. Krall and A. W. Trivelpiece in *Principles of Plasma Physics* (1973) chapters 5 and 12.

Experiments have been performed using this configuration for several years. One such recent experiment had a large radius of the vacuum container torus of 45 cm., a plasma with an ion temperature of 40 eV and an accelerated ion lifetime of 140 microseconds. FIG. 3 indicates the position of the magnetic fields formed in this device. An iron core transducer 20 was used to induce an electric field to drive the beam. While this experiment worked well, the plasma duration and ohmic heating was limited by the Volt-Second rating of the transformer. It would be preferable to control plasma density, rotation speed of the plasma, temperature of the plasma and the duration of plasma containment independently of each other.

SUMMARY OF THE INVENTION

Accordingly, one object of this invention is to provide a novel magnetic confinement device for a nuclear fusion plasma.

Another object of this invention is to provide an improved polytron device for confining a fusion plasma.

A further object of this invention is to provide an improved polytron device having a plasma injection device.

A still further object of this invention is to provide a polytron device with magnetic junctions joining injection devices with the torus.

Another object of the invention is to provide a polytron device which will allow a sustained fusion reaction.

Another Object of the invention is to Prodive a novel injection mechanism which allows the injection of energetic plasma or ions into an already confined plasma, using a magnetic junction.

A further object of the invention is to increase the density of a plasma considerably by an extended injection.

A further object of the invention is to confine particles of large kinetic energy by producing very energetic ions in an apparatus spacially separated from the containment device.

A further object of the invention is, by using two or more magnetic junctions, to allow sustained fusion reactions.

A further object of the invention is by injecting ions or plasma through two or more magnetic junctions at different velocities, to produce a controlled twostream instability, followed by a turbulent heating, which enhances the temperature of the confined plasma and thus produces more thermonuclear reactions.

Briefly, these and other objects of this invention are achieved by providing plasma injection devices spacially separated from the polytron for injecting plasma into the main beam at one or more locations. A magnetic junction joins each injector with the polytron. The coils around the junction are larger than those around the polytron and gradually decrease in size to provide an adiabatic transition for the plasma from the generator into the polytron.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
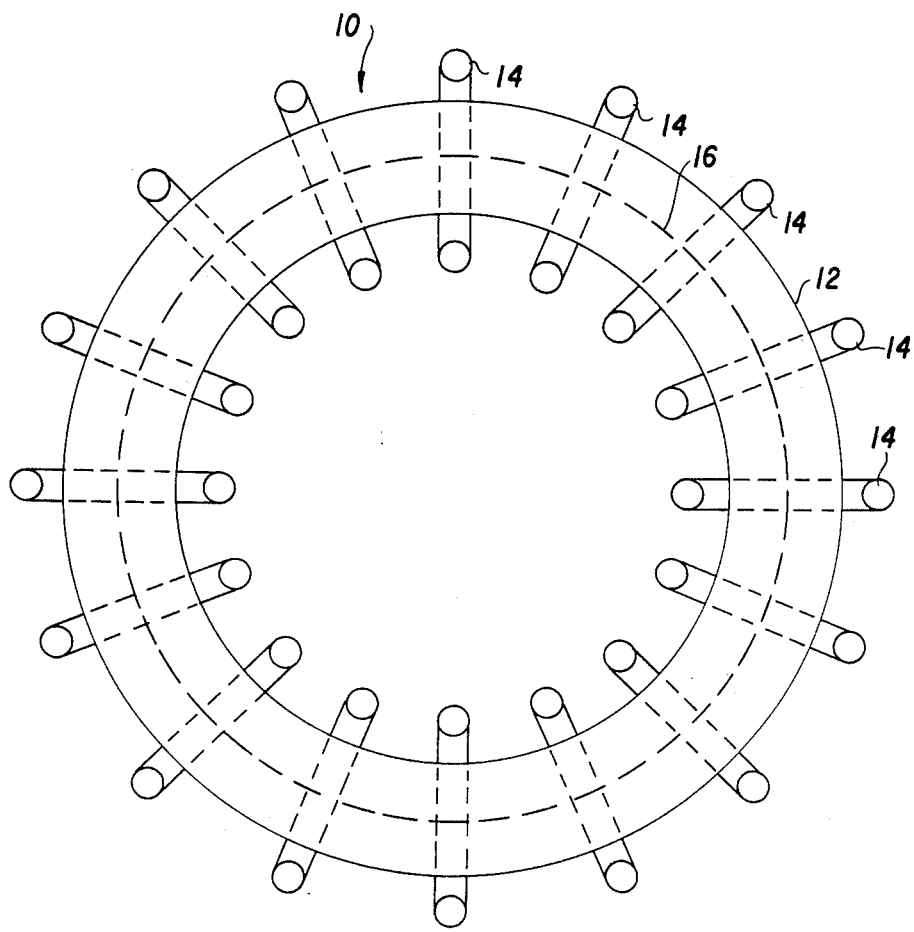
FIG. 1 is a top view of a prior art polytron device.
Figure 2:
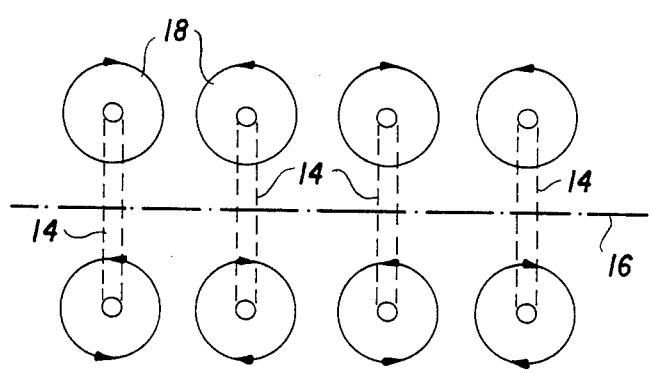
FIG. 2 is a cross-sectional view of the prior art device of FIG. 1.
Figure 3:
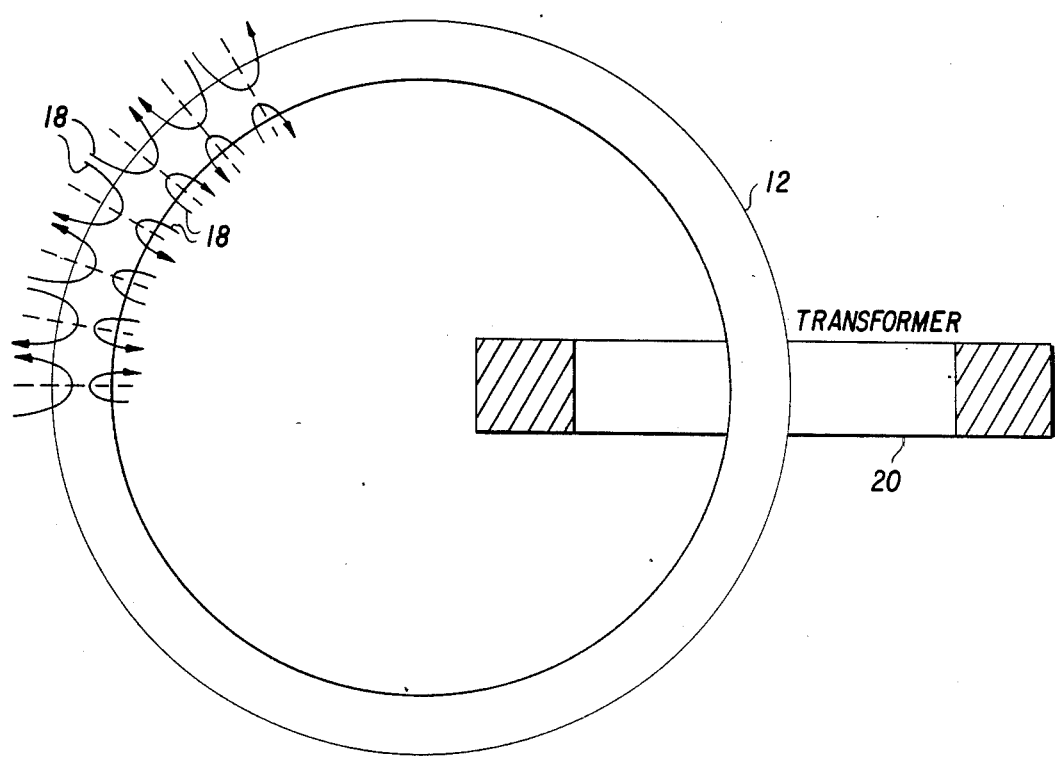
FIG. 3 is a schematic diagram showing the magnetic fields produced in the prior art device of FIG. 1.
Figure 4:
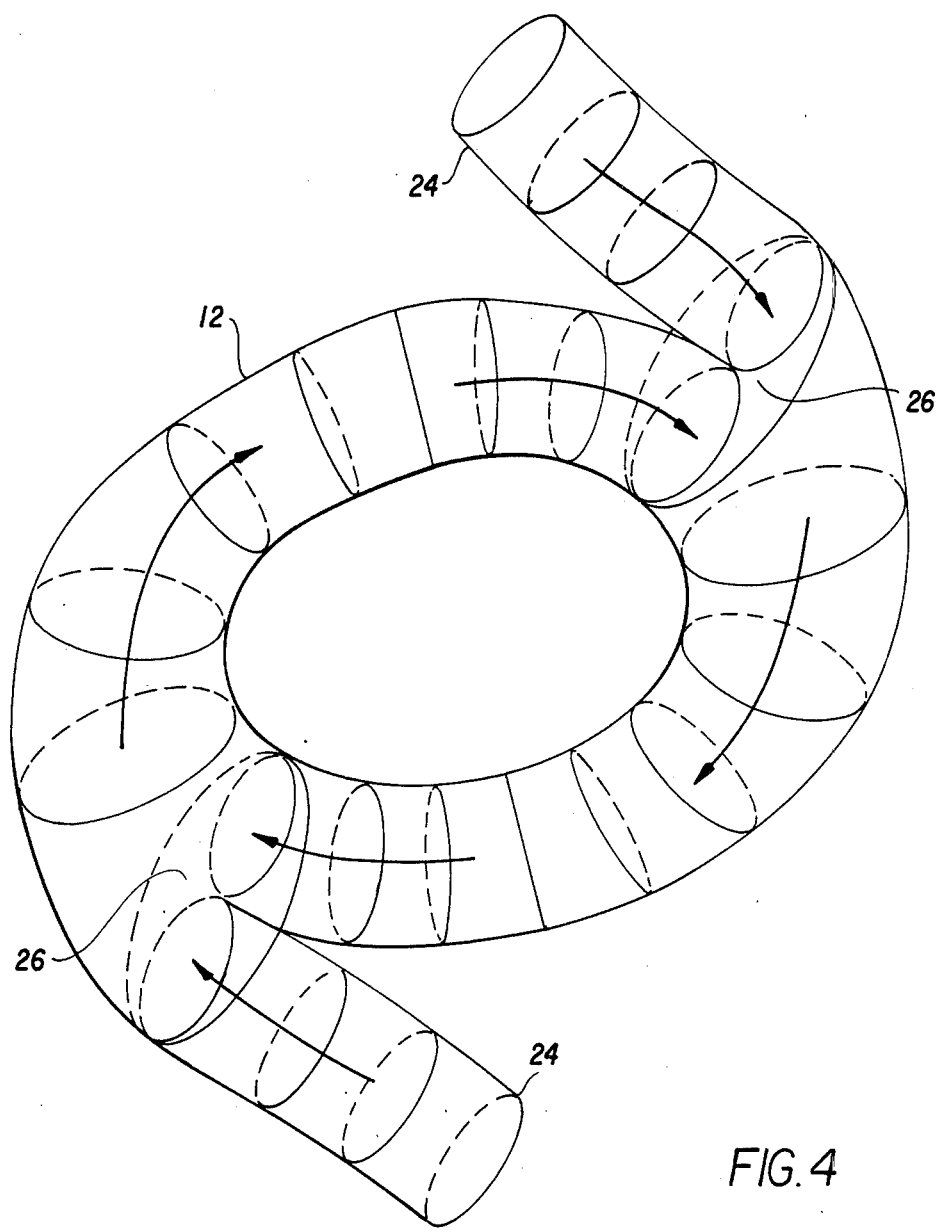
FIG. 4 is a perspective view of the present invention.

Referring now to the drawings, wherein like reference numerals designate identical or corresponding parts throughout the several views, and more particularly to FIG. 4 thereof, wherein the overall arrangement of the various parts of the invention are shown as including polytron 12 with magnetic junction sections 26. The polytron torus is for the most part similar to the device of FIGS. 1–3. However, the present invention also includes ion generating and injection sections 24 which join the torus at magnetic junctions 26.

The ion or plasma generating section 24 is placed outside of the torus with the ions being injected into the toroidal ring through the magnetic junction. The ion generator is based on a system currently used to produce energetic neutral beams for Tokamaks. This is described by W. B. Kunkel in "Neutral Beam Injection", *Fusion,* Academic Press, (1981), Vol. 1 part B p. 103. In such a system, ions are produced and accelerated to high energies (up to 120 KeV). By exposing the ions to the neutral gas, the beam becomes one of energetic neutral particles which are injected into the Tokamak. In the present invention, the ions do not interact with neutral gas but rather are exposed to an electron emitting device. The electrons are accelerated and along with the ions form an energetic plasma moving at high speed.

This plasma is injected into the polytron torus through a junction 26. The junction is formed by the injection path approaching the toroidal path and touching it at a tangent point. At that point the two paths become one large path having a width equal to at least the sum of the two radial dimensions and a height dimension equal to at least the radius of one of the paths. The large path then gradually reduces its size until it again reaches the size of the toroidal path. The coils around the path likewise change size, being larger at the junction point and reducing in size along with the path. The magnetic field likewise changes shape but retains its containment abilities so as to keep both the toroidal beam in its path as well as introducing new particles into the beam.

In FIG. 4 the magnetic junction is shown in such a way that the plasma beam joins the confined plasma from the outside. This realisation is for illustrational purposes only. It does by no means exclude a construction such that the plasma beam joins the confined plasma either from the inside of the torus or from the side, which might have technical advantages.

Figure 5:
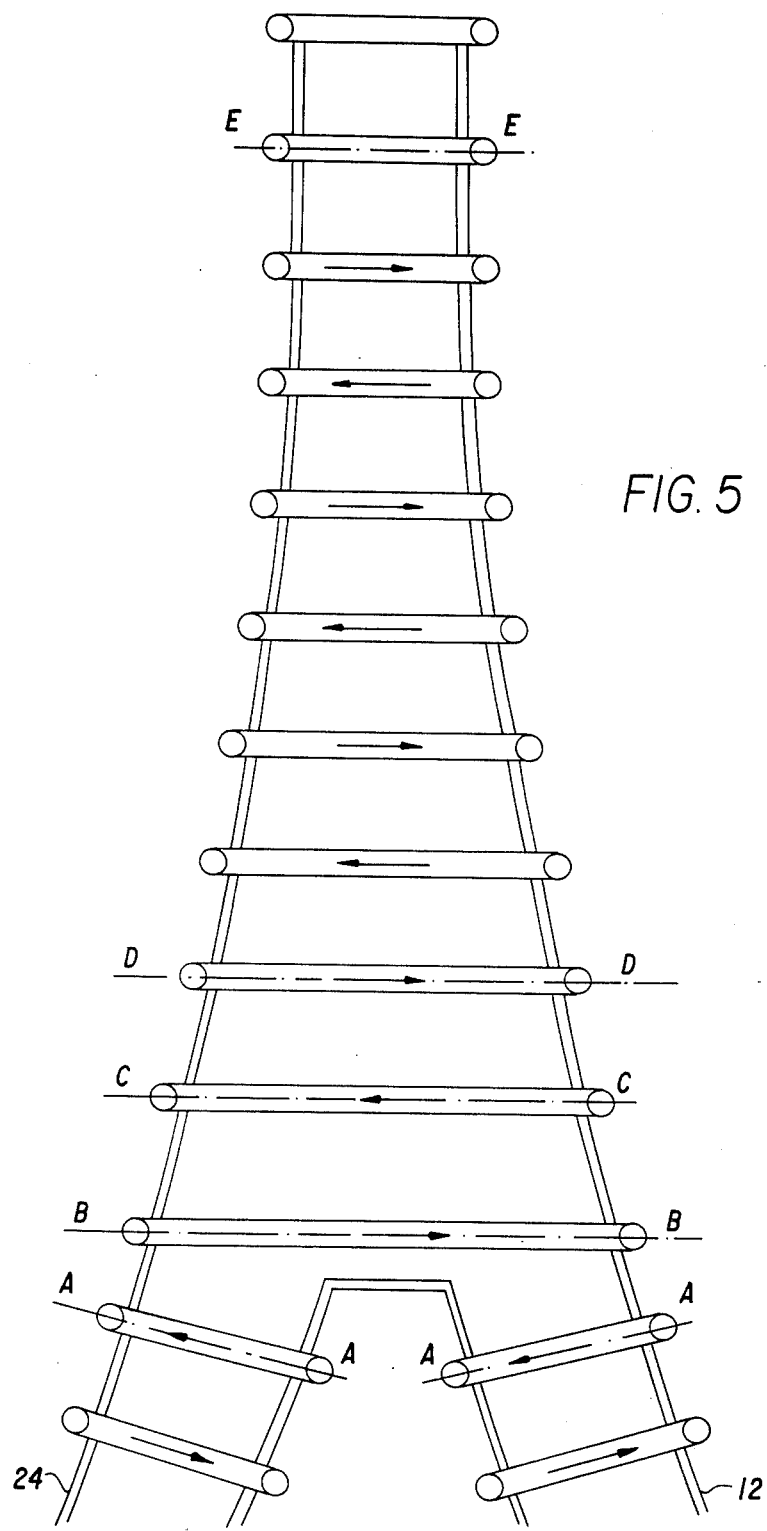
FIG. 5 is a top view of the first embodiment of the junction of the present invention shown in FIG. 4.

The junction is shown in FIG. 5 in more detail and with the path straightened for ease of illustration. As seen at the bottom of the figure, each path has individual coils with current traveling in opposite directions in alternate coils. However, the corrresponding coils in the two paths are matched as to current flow. That is, the coil closest to the junction in each path has the same direction of current. The first coil in the combined path then has current flowing in the opposite direction to the last coils in each separate path. As a result, the transition at the junction point resembles a mere continuation of each path and smoothly joins the paths without an abrupt change. As the magnetic field then returns to its normal size, the two beams are pulled together adiabtically toward the center point of the path forming a single beam.

Figure 6A:
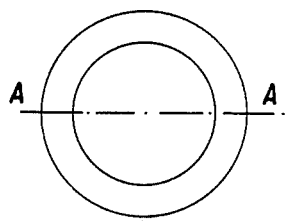
FIGS. 6A–6E are cross-sectional views of the junction of FIG. 4.
Figure 6B:
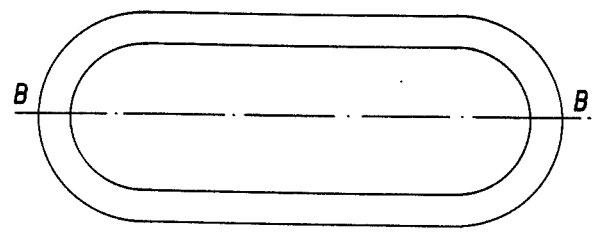
Figure 6B:
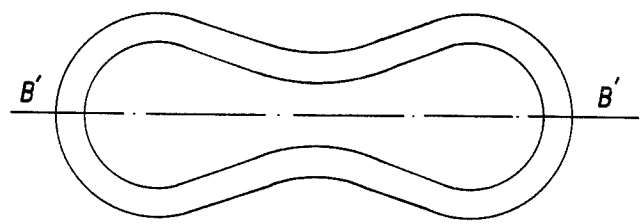
Figure 6C:
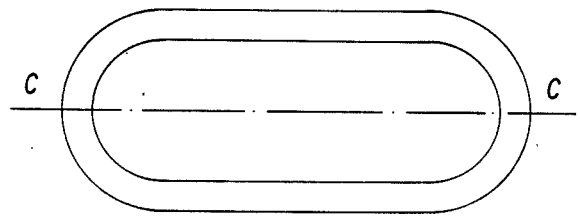
Figure 6D:
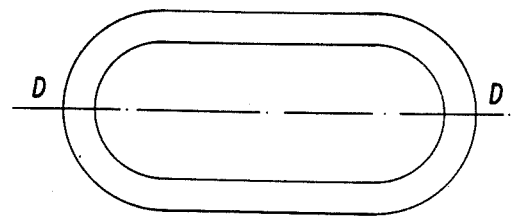
Figure 6E:
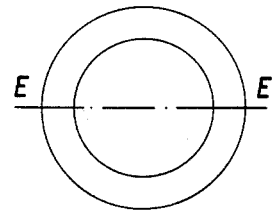

Several of the coils marked as A-A to E-E in FIG. 5 are shown in cross-section in FIGS. 6A–6E. FIG. 6A shows a typical coil on either path being of a standard size circle such as in the prior art. The first coil in the combined path is shown in FIG. 6B as having a "racetrack" shape with semicircular ends and straight sides. The semicircles have the same radius as the circles of FIG. 6A. An alternate arrangement for the coil of FIG. 6B is shown in FIG. 6B'. Here, the straight sides of the racetrack are pinched in the center to form an "hourglass" shape. This shape would strengthen the magnetic field in the center and keep the two separate beams directed and compact until they come together. Further coils could also have this shape but the pinch should become lessened as the sides shorten to allow the beams to approach the center. FIGS. 6C and 6D show later coils on the combined path. These coils also are a "racetrack" shape, but the straight sides become shorter until the semicircular ends touch and the coil again becomes a circle, as seen in FIG. 6E. This coil is a duplicate of the coil shown in 6A. Thus the path returns to its same shape as the beams combine to form the traditional polytron toroidal path.

Figure 7:
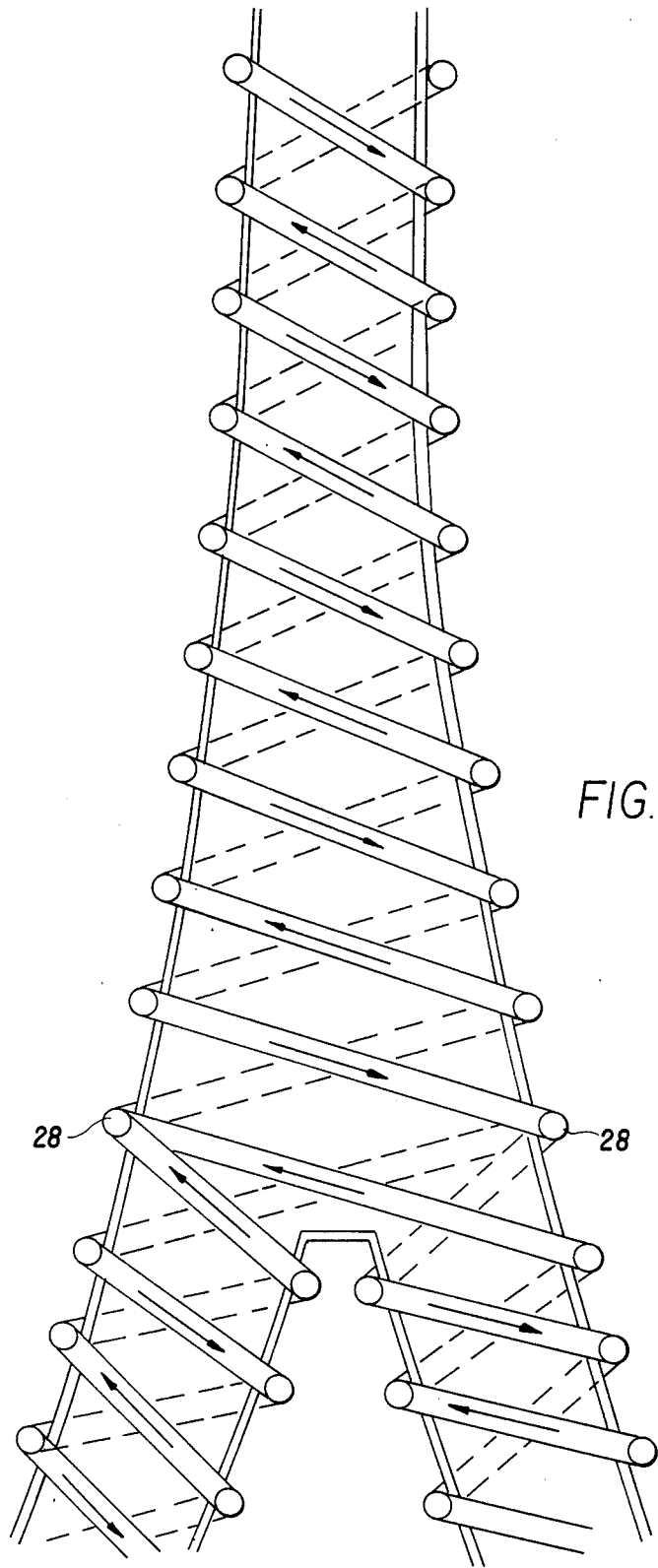
FIG. 7 is a second embodiment of the junction of the present invention shown in FIG. 4.

The coils described so far have been individual circles placed in planes in the radial direction of the torus. Another configuration of these coils is shown in FIG. 7 as two interlaced spiral coils having current flowing in opposite directions in the two coils. At the junction point, each coil splits into two coils indicated at 28. One of each pair of split coils winds around each path. Thus, these coils react at the junction in a manner analogous to that shown in the first embodiment in that both paths have a smooth transition at the junction point.

In practice, the use of a single ion generator with a polytron aids the device in increasing the plasma density. However, it does not give any control over the distribution function of the ions. The ions tend to have the same velocity and as a result few reactions between ions occur. If two ion generators are used to inject ions of different velocities, a much improved result occurs. A two stream instability with turbulent mixing of the beams and numerous reactions between ions will occur. The greater the number of reactions, the more power is generated and the closer the system comes to being self sustaining. Also the operating time of the machine is limited only by the pulse length of the injected beam.

If several injectors are fired in succession, the time of operation may be extended even further. The use of several injectors would also enhance the plasma density even further.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for containing and accelerating a beam of charged particles comprising:
   a torus-shaped vacuum container means;

a plurality of magnetic means, each of said magnetic means encircling said torus in a plane so as to form a magnetic field in the shape of circular line cusps;

at least one charged particle injection means for generating and injecting charged particles into said container means;

a magnetic junction joining each of said at least one charged particle injection means and said container means said magnetic junction having a tapered shape with the upstream end having a width approximately equal to the sum of the widths of said container means and said injector means and with the downstream end being the same shape as said container means;

some of said plurality of magnetic means encircling said magnetic junction with the magnetic means being racetrack shaped at the upstream end and decreasing in width near the downstream end;

wherein said charged beam is contained and accelerated in said container means by said magnetic means and said charged particle injection means injects additional charged particles into said beam of charged particles through said magnetic junction.

2. An apparatus according to claim 1 wherein said at least one charged particle injection means is at least two charged particle injection means.

3. An apparatus according to claim 2 wherein each of said charged particle injection means generates charged particle beams at different velocities.

4. An apparatus according to claim 1 wherein said magnetic means are permanent magnets.

5. an apparatus according to claim 1 wherein said magnetic means are wire loops for carrying electric currents.

6. An apparatus for containing and accelerating a beam of charged particles, comprising:

a torus-shaped vacuum container means;

magnetic means including a first wire and a second wire, both of said wires being wound in parallel spirals on the outside of said container means, said wires carrying electrical current which flow in opposite directions to each other so as to form a magnetic field having cusps;

at least one charged particle injection means for generating and injecting charged particles into said container means;

a magnetic junction joining each of said at least one charged particle injection means and said container means;

wherein at the junction point, said first wire and said second wire each divide so as to form an additional magnetic means around said injection means; and wherein said beam of charged particle is contained and accelerated in said container means by said magnetic means and said charged particle injection means injects additional charged particles into said beam of charged particles through said magnetic junction.

7. A nuclear fusion containment device comprising:

a torus-shaped vacuum container means for containing a main plasma beam;

a plurality of charged particle injection means for generating and injecting an energized charged particle beam into said container means, each of said injection means generating charged particles of different velocity;

a plurality of junctions, each of said junctions joining one charged particle injection means to said container means, each of said junctions having a tapered shape with the upstream end having a width approximately equal to the sum of the widths of said container means and said injection means and with the downstream end being the same shape as said container means;

a plurality of magnetic means, each of said magnetic means encircling a beam path and one of said container means, said injection means and said junctions; most of said magnetic means being of a first size, the remainder of said magnetic means being located near said junctions and being larger than said first size, said magnetic means encircling said junctions being racetrack shaped at the upstream end and decreasing in width near the downstream end;

wherein said injection means injects additional charged particles of differing velocities into said container means to create a two stream instability in said main plasma beam to allow fusion reactions to take place.

* * * * *